United States Patent [19]
Hay

[11] Patent Number: 6,044,583
[45] Date of Patent: Apr. 4, 2000

[54] SPINNING AERIAL FISHING LURE

[76] Inventor: James D. Hay, 21746 73rd Pl., Vero Beach, Fla. 32966

[21] Appl. No.: 09/247,649

[22] Filed: Feb. 9, 1999

[51] Int. Cl.[7] ................................................... A01K 85/12
[52] U.S. Cl. ......................... 43/42.19; 43/42.2; 43/42.46
[58] Field of Search ................... 43/42.19, 42.2, 43/42.21, 42.46, 42.51, 43.13, 44.9

[56] References Cited

U.S. PATENT DOCUMENTS

| | | |
|---|---|---|
| 1,116,025 | 11/1914 | Cripe . |
| 1,897,529 | 2/1933 | Palmer et al. . |
| 3,397,478 | 8/1968 | Lowes, Jr. . |
| 3,805,437 | 4/1974 | Harris . |
| 4,201,008 | 5/1980 | Sparkman . |
| 4,501,086 | 2/1985 | Bunce ........................................ 43/42.2 |
| 4,510,710 | 4/1985 | Hanna et al. ............................ 43/42.13 |
| 4,653,218 | 3/1987 | Margulis . |
| 5,050,334 | 9/1991 | Standish, Jr. . |
| 5,138,789 | 8/1992 | Hood ....................................... 43/42.13 |

*Primary Examiner*—Jack W. Lavinder
*Attorney, Agent, or Firm*—Gene Scott-Patent Law & Venture Group

[57] ABSTRACT

A fly-fishing aerial spinner lure is constructed of such light weight and small size as to be effective in rotating at a high angular velocity when casting a fly fishing line. The spinner is able to flex with the line and is metallized to provide an attractive appearance to fish. A delta shaped wing is mounted onto a flexible and self lubricated tube so as to be easily threaded onto a line and yet to be able to rotate without significant friction or line wear.

9 Claims, 1 Drawing Sheet

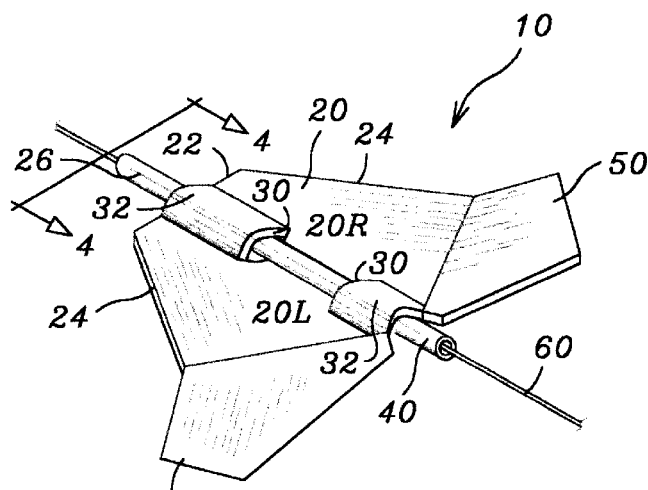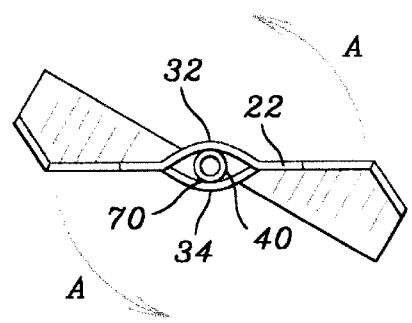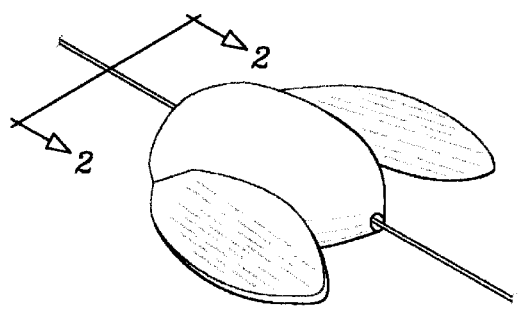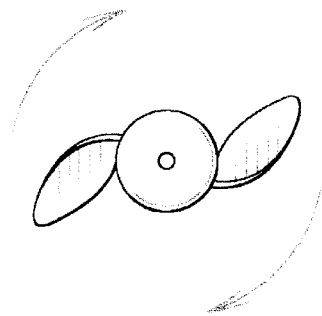
Fig. 3
Fig. 4
Fig. 1
Prior Art
Fig. 2
Prior Art

SPINNING AERIAL FISHING LURE

BACKGROUND OF THE INVENTION

1. Field of the Invention

This invention relates generally to fishing lures, and more particularly to a spinner for fly fishing which is light weight, strong so as to be reusable, effective in attracting fish and very inexpensive to produce.

2. Description of Related Art

The following art defines the present state of this field:

Worden, provides a commercial product having the registered trademark: Spin-n-Glo®, and is produced by Worden's Lures, Yakima Bait Co., P.O. Box 310, 1000 Bailey Ave., Granger, Wash. 98932. This product is an aerial lure similar to the instant invention and is shown in FIGS. 1 and 2 of the drawing as prior art. This lure provides a composition or foam body with a pair of short stubby wings extending from opposite sides of the lure, and has a linear hole drilled through the body for mounting the lure on a fishing line.

Standish, U.S. Pat. No. 5,050,334 describes a sound producing fishing lure having an elongated body secured to a hook and a pair of bendable arms. Rod members attached to the arms rotatably support spinners that intermittently hit each other to produce fish attracting sounds. The arms are bendable to change the relative lateral positions of the spinners thereby change the sounds producing characteristics of the lure.

Margulis, U.S. Pat. No. 4,653,218 is a lightweight fishing lure comprising an elongate, non-rotative shaft having an attachment portion for a fish-line at its front end, and a support for an oscillatory member at its rear end. The oscillatory member has tail mounting means serving to detachably mount a tail, with the support defining an axis essentially perpendicular to the axis of the elongate shaft. The oscillatory member is rotatable for a number of degrees in each direction about the perpendicular axis, and a motion producing member is mounted on the elongate shaft at a location intermediate the ends thereof. An operative connection is formed between the motion producing means and the oscillatory member, so that a tail mounted on the oscillatory member will be caused to undertake a motion closely resembling that of a swimming fish. A weight placed outboard of the axis of rotation of the motion producing member prevents the lure from tending to rotate as a result of the passage of water thereover, and quite advantageously, make it readily possible for the fisherman to change the amplitude of oscillation of the tail.

Hanna et al., U.S. Pat. No. 4,510,710 this disclosed fishing lure is a surface-type lure for attracting large mouth bass. The lure includes a shank with a barbed hook at one end and an eyelet at the other. A body with a skirt is attached adjacent the hook and two rearwardly extending arms are attached at the eyelet. Each arm has a propeller rotatably mounted on it, and a flotation device is attached to the rear end of each arm. The propellers and flotation devices bring the lure to the surface quickly during retrieval and allow a slow rate of retrieval.

Sparkman, U.S. Pat. No. 4,201,008 is a fishing lure for surface use comprising two fishhooks, two spinners, a generally V-shaped carrier bracket having vertical offsets to place the shanks of the fishhooks below the rotational axes of the spinners, and sinkers in association with each of the fishhooks. The spinners may be formed of a blank made from a sheet of metal having lugs at opposite ends thereof bent in parallel planes on opposite sides thereof; an opening through the blank spaced approximately equidistant from the lugs; a pair of conical protrusions extending outwardly from the plane of the blank, each such protrusion being on a side opposite from the lug adjacent thereto; and oppositely bent impeller blades. Also provided is an improved fishing lure, which comprises the above spinner.

Harris, U.S. Pat. No. 3,805,437 is artificial bait having a fish-attracting or luring portion that is followed by at least two artificial bait portions which appear in active pursuit of the luring portion. The luring portion can be of a flashing or of other attention-getting construction, while the bait portions preferably have a more natural character and construction. The appearance of two or more natural looking baits in pursuit of the attention-getting portion allays apprehension in the fish produced by the luring portion.

Lowes, U.S. Pat. No. 3,397,478 is a fishing device and more specifically a lure, which attracts fish by emitting sonic impulses as it is drawn through the water. The sonic impulses are produced by at least one rotatable member and a helical cam, which is raised by the follower and abruptly dropped by the action of the water.

Palmer et al., U.S. Pat. No. 1,897,529 in a fishing lure, a hollow spinner having the shape of a frustum of a cone with a slight convexity on its outer surface, the apex end of the frustum having a perforation, the spinner having a pair of diametrically opposed V-shaped notches at the lower end or base portion of the frustum with skirt portions flared outwardly in opposite directions to form flared blades, said blades being sloped symmetrically as to the axis of the spinner and being warped to form a pitch to rotate the spinner when drawn through the water.

Cripe, U.S. Pat. No. 1,116,025 is an artificial lure including a hook having a shank, a weight secured to the shank, and a spinning element mounted on the shank including a cone shaped body tapering forwardly to a point in immediate contact with the shank and propeller shaped blades extending rearwardly from the cone over the weight, whereby the spinning element presents a continuous tapering surface obviating weed catching formations in the forward movement of the lure and to serve as a weed guard for the weight.

The prior art teaches the use of lures which are functional both while the line is in the air during casting, and also when the line is in the water just after casting. However, the prior art does not teach that a lure may be constructed of ultralight weight materials and of the simple construction of the present invention to provide the advantages of low cost and low weight and drag when casting a line. The present invention fulfills these needs and provides further related advantages as described in the following summary.

SUMMARY OF THE INVENTION

The present invention teaches certain benefits in construction and use which give rise to the objectives described below.

The present invention provides a fly-fishing spinner lure constructed of such light weight material and of such small size as to be effective in rotating at a high angular velocity when casting a fishing line with the spinner mounted near the line's end. The spinner is able to flex with the line and is metallized to provide an attractive appearance to fish. A delta shaped wing is mounted onto a flexible and self lubricated tube so as to be easily threaded onto a line and yet to be able to rotate without significant friction or line wear.

A primary objective of the present invention is to provide an aerial spinning fishing lure having advantages not taught by the prior art.

Another objective is to provide such a spinning fishing lure that is of such weight as to provide negligible effect on the arc of a fly-fishing line when cast.

A further objective is to provide such a spinning fishing lure that is so inexpensive to produce due to its simple construction and automatable assembly, as to add negligibly to the cost of fishing, whether for food or sport.

A still further objective is to provide a flexible spinning fishing lure of a flexible material so as to enable the lure to flex with the fishing line so as to reduce the incidence of line tangles.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings:

FIG. 1 is a perspective view of a prior art device;

FIG. 2 is a front elevational view thereof taken in the direction shown by arrows 2—2 in FIG. 1 (fishing line not shown);

FIG. 3 is a perspective view of the preferred embodiment of the present invention; and FIG. 4 is a front elevational view thereof taken in the direction shown by arrows 4—4 in FIG. 3 (fishing line not shown).

DETAILED DESCRIPTION OF THE INVENTION

The above described drawing figures illustrate the invention, a fishing lure apparatus 10 comprising: a primary wing 20 providing a forward edge 22 and, swept back from the forward edge 22, a pair of opposing side edges 24, a longitudinal line of symmetry 26 dividing the primary wing 20 into a left 20L and a right 20R wing halves between the side edges 24 and the line of symmetry 26; a pair of transverse cuts 30 in the primary wing 20 forming a pair of convex surface portions 32 separated by a concave surface portion 34, the surface portions 32, 34 aligned along the line of symmetry 26. This construction is of very low cost and is easily automated for low cost fabrication and assembly.

The convex surface portions 32 and the concave surface portion 34 clamp between them, a linear tube 40 inserted therebetween, the linear tube 40 lying along the line of symmetry 26 of the primary wing 20. A pair of trailing wings 50, integral with the primary wing 20, are formed at an obtuse angle to the primary wing 20 so as to cause the apparatus to rotate (see arrows "A") about a fishing line 60 which is threaded through the linear tube 40, when a fluid such as air or water moves across the primary wing 20 from the forward edge 22 toward the trailing wings 50 (see arrows "4" in FIG. 3). The apparatus 10 being of low mass rotates at a very high rate of speed comparable to the speed of many water insects, so as to attract fish that prey on these species.

The apparatus 10 is inventively quite small, having a width of between approximately 10 mm and 19 mm and a length of between approximately 10 mm and 15 mm and is made of a stiff, resilient material of approximately 0.008 inches thickness so that the total weight is in the range of approximately 0.05 to 0.11 grams and provides neutral buoyancy so as to be useful with both floating and sinking flys and lures. The primary wing 10 and the trailing wings 50 are preferably cut from a single piece of a polyester sheet stock such as Mylar® or a similar stiff and resilient material which may be formed into a shape of choice and which will resiliently maintain such shape thereafter. The sheet stock is inventively metallized so as to be more attractive to fish. Inventively, the primary wing 10 and the linear tube 60 are joined by a bonding agent 70, such as a cyanoacrilate type, where the concave 32 and convex 34 surface portions lay in contact with the linear tube 40 as shown best in FIG. 4. Inventively, the linear tube 40 is made of a flexible, resilient, self-lubricating rubber-like material of any type well known in the art, but preferably a synthetic rubber, so as to generate little friction with the fishing line 60 and so that the linear tube 40, and indeed, the primary wing 20 itself, is able to flex somewhat with the fishing line 60 when cast. Additionally, the liner tube 40 is of such diameter and length, as may be determined by experiment, as to produce a whistling sound when the line is cast. This sound is advantageously used to determine when the line is snarled or caught whereupon the sound ceases.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A fishing lure apparatus comprising:

a primary wing providing a forward edge and, swept back from the forward edge, a pair of opposing side edges, a longitudinal line of symmetry dividing the primary wing into a left and a right wing halves between the side edges and the line of symmetry;

a pair of transverse cuts in the primary wing forming a pair of convex surface portions separated by a concave surface portion, the surface portions aligned along the line of symmetry;

the convex surface portions and the concave surface portion clamping a linear tube inserted therebetween, the linear tube lying along the line of symmetry of the primary wing;

a pair of trailing wings integral with the primary wing and formed at an obtuse angle therewith so as to cause the apparatus to rotate about a fishing line through the linear tube when a fluid moves across the primary wing from the forward edge toward the trailing wings.

2. The apparatus of claim 1 having a width of from approximately 10 mm to 19 mm and a length of from approximately 10 mm to 15 mm and made of a stiff, resilient material of approximately 0.008 inches thickness.

3. The apparatus of claim 1 having a weight of between approximately 0.05 and 0.11 grams.

4. The apparatus of claim 1 wherein the primary wing and the trailing wings are made of a single piece of a stiff and resilient material.

5. The apparatus of claim 4 wherein the material of construction of the wings is polyester.

6. The apparatus of claim 1 wherein the primary wing and the linear tube are joined by a bonding agent.

7. The apparatus of claim 1 wherein the linear tube is made of a flexible self-lubricating rubber-like material.

8. The apparatus of claim 1 wherein the linear tube is of such diameter and length as to produce a whistling sound when cast with a line.

9. The apparatus of claim 1 wherein the apparatus is constructed of materials providing the apparatus with a near neutral buoyancy.

* * * * *